(12) United States Patent
Jyouzaki et al.

(10) Patent No.: US 12,703,240 B2
(45) Date of Patent: Aug. 11, 2026

(54) OFF-ROAD VEHICLE

(71) Applicant: KAWASAKI MOTORS, LTD., Hyogo (JP)

(72) Inventors: Takahiro Jyouzaki, Akashi (JP); Takashi Hiraga, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 292 days.

(21) Appl. No.: 18/399,784

(22) Filed: Dec. 29, 2023

(65) Prior Publication Data

US 2025/0214415 A1 Jul. 3, 2025

(51) Int. Cl.
*B60K 13/04* (2006.01)
*B60K 11/06* (2006.01)

(52) U.S. Cl.
CPC .............. *B60K 13/04* (2013.01); *B60K 11/06* (2013.01)

(58) Field of Classification Search
CPC ........... B60K 13/04; B60K 11/06; B60K 5/04
See application file for complete search history.

(56) References Cited

U.S. PATENT DOCUMENTS 7,191,753 B2 * 3/2007 Sagara ...................... F01P 1/02 181/204
8,118,001 B2 * 2/2012 Kowada ................. F01P 11/029 123/41.1
8,439,141 B2 5/2013 Bessho et al.
11,434,981 B2 * 9/2022 Oyama ............... F16H 57/0416
2018/0030879 A1 * 2/2018 Jyouzaki ................... F01P 3/02
2021/0354542 A1 * 11/2021 Schleif ..................... B60K 5/02
2022/0355659 A1 * 11/2022 Purdy ................. F01N 13/1816
2022/0355877 A1 * 11/2022 Jyouzaki ................ B60K 17/00
2022/0356939 A1 * 11/2022 Shimatani ........... F16H 57/0417

* cited by examiner

*Primary Examiner* — Timothy Hannon
(74) *Attorney, Agent, or Firm* — XSENSUS LLP

(57) ABSTRACT

An off-road vehicle includes an internal combustion engine, an exhaust assembly, and a fan that sends outside air toward the exhaust assembly. A direction orthogonal to both of a first direction in which a crank shaft of the internal combustion engine extends and a second direction in which a cylinder of the internal combustion engine extends is defined as a third direction. The exhaust assembly is adjacent to the internal combustion engine in the third direction. The fan overlaps the internal combustion engine in the third direction.

19 Claims, 12 Drawing Sheets

OFF-ROAD VEHICLE

BACKGROUND OF THE INVENTION

Field of the Invention

The present disclosure relates to an off-road vehicle including an internal combustion engine.

Description of the Related Art

U.S. Pat. No. 8,439,141 B2 discloses an off-road vehicle that is also called a utility vehicle. Each of off-road vehicles, such as the off-road vehicle disclosed in U.S. Pat. No. 8,439,141 B2, includes a CVT (continuously variable transmission) that changes the rotational speed of driving power output by an internal combustion engine. An intake duct and exhaust duct for air cooling are connected to the CVT. Air introduced from an outside of the vehicle through the intake duct into a case of the CVT cools a belt and the like in the case, and the air which has been increased in temperature by the heat exchange is discharged through the exhaust duct to the outside of the vehicle. An exhaust port of the exhaust duct is directed to an exhaust apparatus. The air discharged from the exhaust port hits the exhaust apparatus to cool the exhaust apparatus.

However, the air discharged from the exhaust port increases in temperature by cooling the belt and the like in the CVT. Therefore, it is difficult to improve a cooling effect obtained by making the air blow against the exhaust apparatus from the exhaust port. Especially, when realizing high output of the internal combustion engine, the exhaust apparatus increases in temperature. Therefore, it is desired to suppress an excessive temperature increase of the exhaust apparatus. On the other hand, it is desired to avoid changes, such as an increase in size of the off-road vehicle to suitably cool the exhaust apparatus.

An object of one aspect of the present disclosure is to prevent an excessive temperature increase of an exhaust apparatus while preventing an increase in size of an off-road vehicle.

SUMMARY OF THE INVENTION

An off-road vehicle according to one aspect of the present disclosure includes: an internal combustion engine including a crank shaft, a crank case accommodating the crank shaft, and a cylinder projecting from the crank case and including an intake port and an exhaust port; an exhaust assembly including an exhaust pipe connected to the exhaust port of the cylinder; and a fan that sends outside air toward the exhaust assembly. A direction orthogonal to both of a first direction in which the crank shaft extends and a second direction in which the cylinder extends is defined as a third direction. The exhaust assembly is adjacent to the internal combustion engine in the third direction. The fan overlaps the internal combustion engine in the third direction.

An off-road vehicle according to another aspect of the present disclosure includes: an internal combustion engine including a crank shaft, a crank case accommodating the crank shaft, and a cylinder projecting from the crank case and including an intake port and an exhaust port; a continuously variable transmission that changes speed of driving power of the internal combustion engine; an exhaust assembly including an exhaust pipe connected to the exhaust port of the cylinder; a fan which is located outside the continuously variable transmission, is mounted on the internal combustion engine, and sends outside air toward the exhaust assembly; and a linkage that transmits the driving power of the internal combustion engine to the fan.

DETAILED DESCRIPTION

Hereinafter, embodiments will be described with reference to the drawings. Directions in the following description are based on directions of an off-road vehicle 1 unless otherwise specified. A left-right direction X corresponds to a vehicle width direction. A front-rear direction Y corresponds to a vehicle longitudinal direction. An upper-lower direction Z corresponds to a vertical direction. In the present embodiment, the left-right direction X, the upper-lower direction Z, and the front-rear direction Y respectively correspond to a first direction, a second direction, and a third direction.

Embodiment 1

Figure 1:
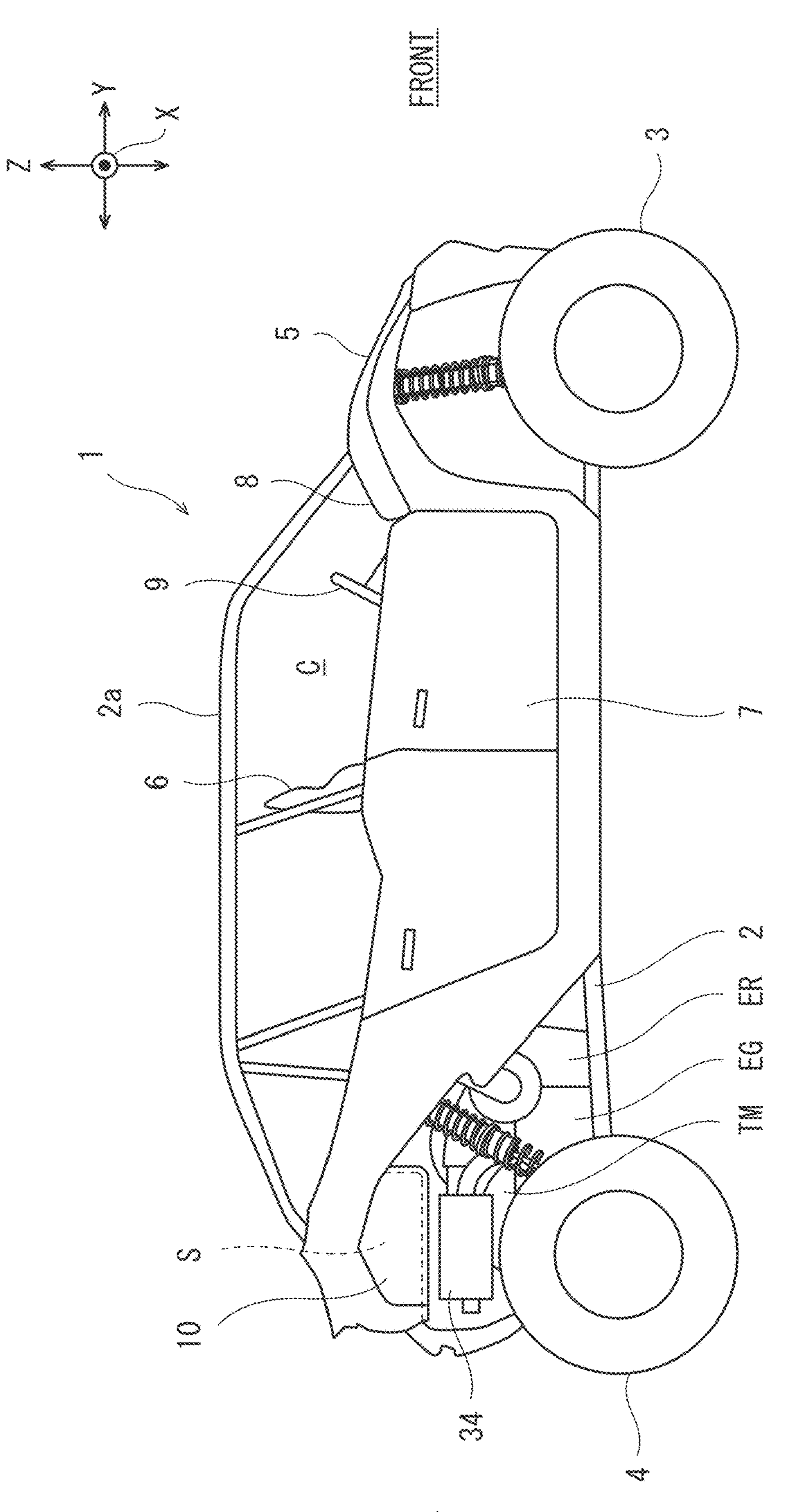
FIG. 1 is a right side view of an off-road vehicle according to Embodiment 1.

FIG. 1 is a right side view of the off-road vehicle 1 according to Embodiment 1. As shown in FIG. 1, the off-road vehicle 1 includes a vehicle body frame 2, a pair of left and right front wheels 3 supporting a front portion of the vehicle body frame 2, and a pair of left and right rear wheels 4 supporting a rear portion of the vehicle body frame 2. The vehicle body frame 2 is a pipe frame including pipes connected to each other. Tires of the front and rear wheels 3 and 4 are balloon tires for uneven ground traveling. A space between the left front wheel 3 and the right front wheel 3 is covered with a hood 5 from above.

An occupant seat 6 supported by the vehicle body frame 2 and including a driver's seat is located behind the hood 5. The vehicle body frame 2 includes, for example, a cabin frame 2*a* surrounding a cabin C in which the occupant seat 6 is located. The cabin C is exposed to an outside. A side door 7 is located at a lateral side of the cabin C. A dash panel 8 is located in front of the driver's seat. A steering wheel 9 is located at the dash panel 8 so as to project toward the driver's seat.

A cargo bed 10 supported by a rear frame of the vehicle body frame 2 is located behind the cabin frame 2*a*. The cargo bed 10 defines a hollow loading space S that is open upward. An engine room ER is located behind the cabin C and under the cargo bed 10. An internal combustion engine EG and a continuously variable transmission TM that changes the speed of driving power output by the internal combustion engine EG are located in the engine room ER. The internal combustion engine EG and the continuously variable transmission TM are supported by the rear frame of the vehicle body frame 2. A muffler 11 is connected to the engine room ER. The muffler 11 allows exhaust from the internal combustion engine EG to flow therethrough to reduce the noise of the exhaust.

Figure 2:
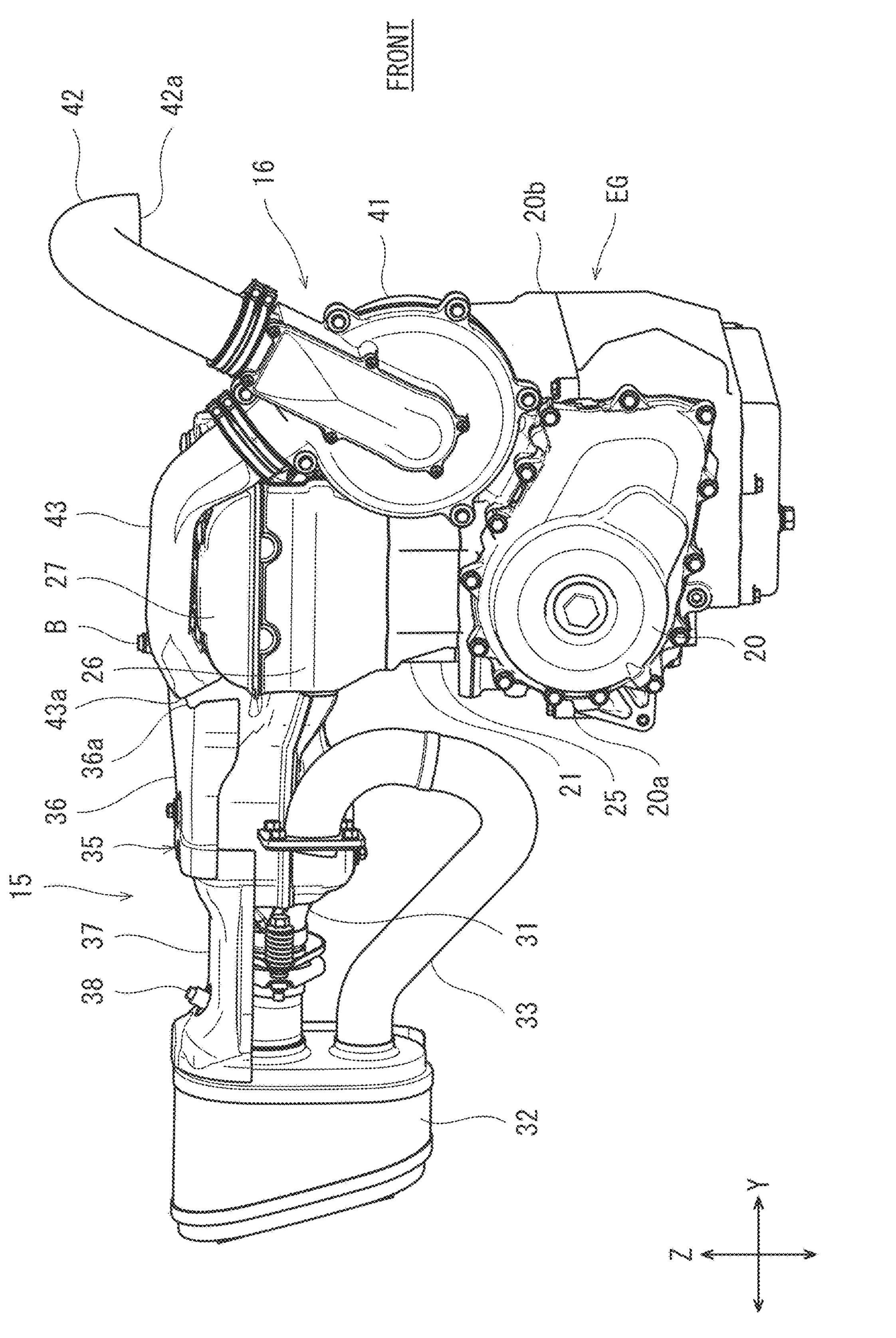
FIG. 2 is a perspective view showing an internal combustion engine, an exhaust assembly, and an air cooling structure in the off-road vehicle of FIG. 1 when viewed from a front right side.
Figure 3:
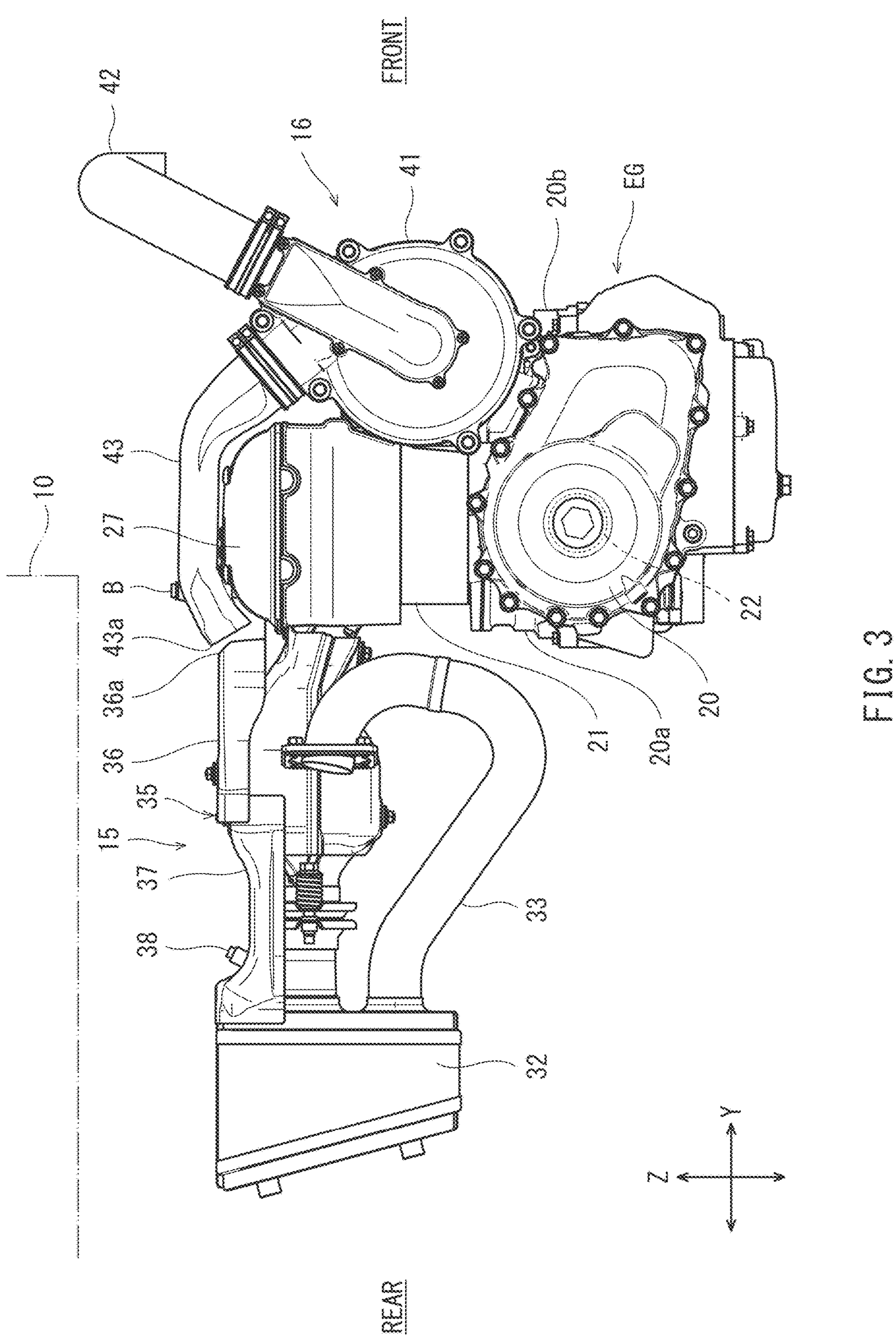
FIG. 3 is a right side view showing the internal combustion engine, the exhaust assembly, and the air cooling structure shown in FIG. 2.
Figure 4:
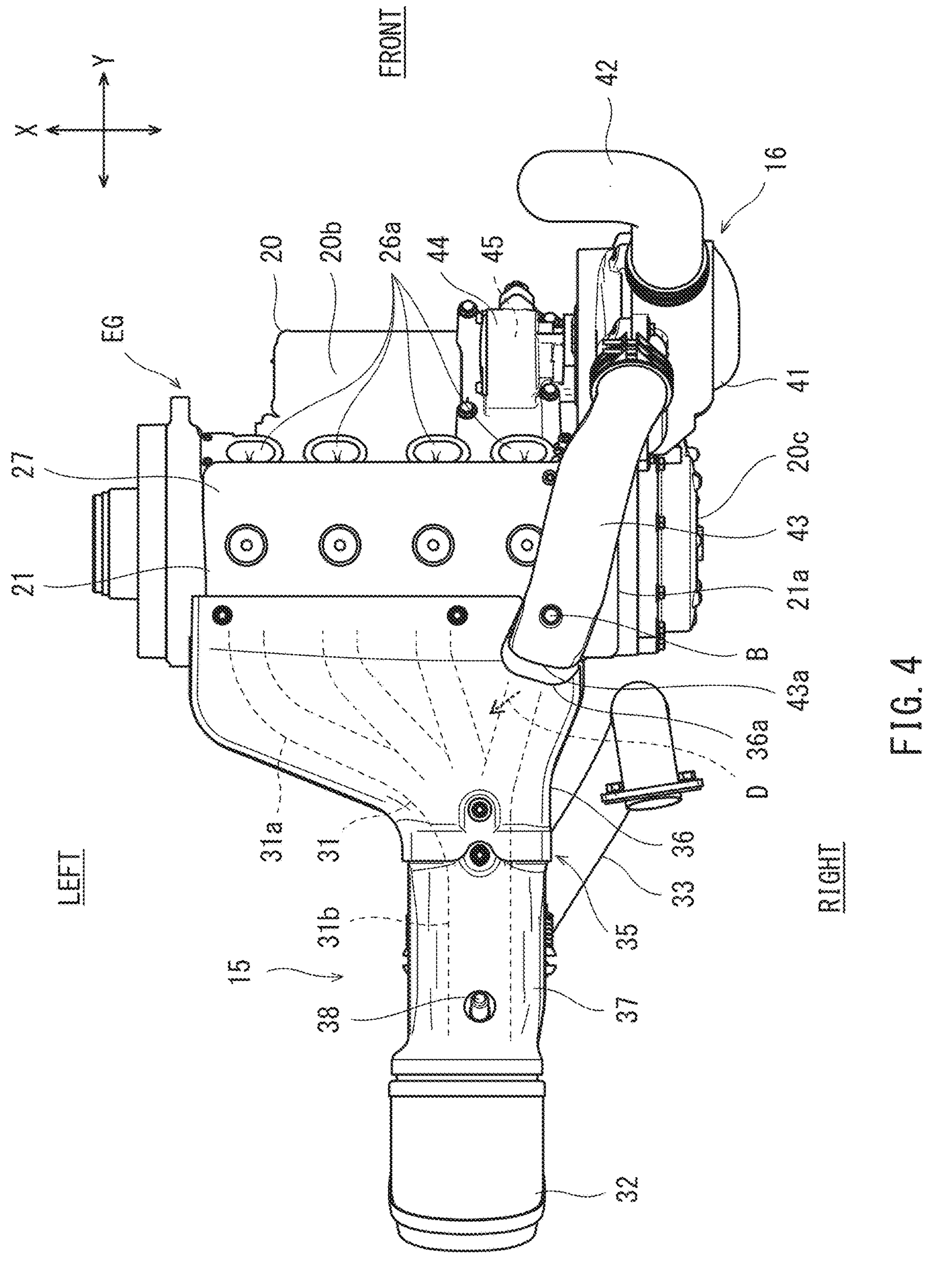
FIG. 4 is a plan view showing the internal combustion engine, the exhaust assembly, and the air cooling structure shown in FIG. 2.
Figure 5:
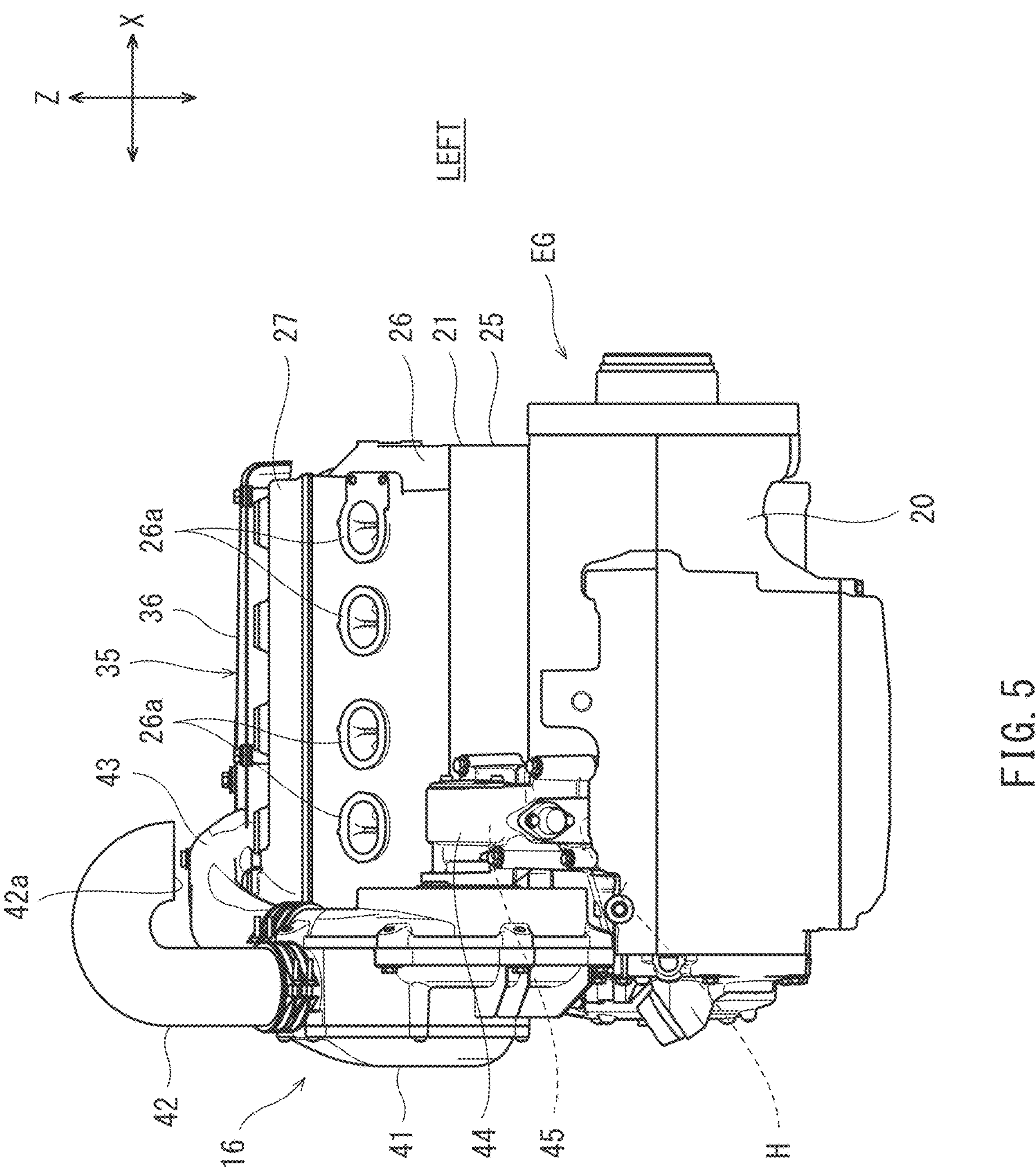
FIG. 5 is a front view showing the internal combustion engine, the exhaust assembly, and the air cooling structure shown in FIG. 2.

FIG. 2 is a perspective view showing the internal combustion engine EG, an exhaust assembly 15, and an air cooling structure 16 in the off-road vehicle 1 of FIG. 1 when viewed from a front right side. FIG. 3 is a right side view showing the internal combustion engine EG, the exhaust assembly 15, and the air cooling structure 16 shown in FIG. 2. FIG. 4 is a plan view showing the internal combustion engine EG, the exhaust assembly 15, and the air cooling structure 16 shown in FIG. 2. FIG. 5 is a front view showing the internal combustion engine EG, the exhaust assembly 15, and the air cooling structure 16 shown in FIG. 2.

As shown in FIGS. 2 and 3, the internal combustion engine EG includes: a crank shaft 22 extending in the left-right direction X; a crank case 20 accommodating the crank shaft 22; and a cylinder 21 projecting upward from the crank case 20. The internal combustion engine EG is, for example, a multiple cylinder engine and includes the cylinders 21 lined up in the left-right direction X. Specifically, the internal combustion engine EG is a four-cylinder engine. The crank case 20 includes: a cylinder mounting portion 20*a* on which the cylinder 21 is mounted; and an extending portion 20*b* projecting forward from the cylinder mounting portion 20*a*. The extending portion 20*b* is displaced relative to the cylinder 21 in a horizontal direction (see FIG. 4).

The cylinder 21 includes: a cylinder block 25 fixed to the cylinder mounting portion 20*a* of the crank case 20 from above; a cylinder head 26 fixed to the cylinder block 25 from above; and a cylinder head cover 27 fixed to the cylinder head 26 from above. The cylinder head 26 includes intake ports 26*a* (see FIG. 5) and exhaust ports 26*b* (see FIGS. 8 and 10). The intake ports 26*a* are located at a front side of the cylinder 21, and the exhaust ports 26*b* are located at a rear side of the cylinder 21.

The exhaust assembly 15 is connected to the internal combustion engine EG. The exhaust assembly 15 is located at a rear side of the cylinder 21 and is adjacent to the internal combustion engine EG. The cargo bed 10 is located at a vertically upper side of the exhaust assembly 15. The exhaust assembly 15 includes an exhaust manifold 31, a pre-muffler 32, a coupling exhaust pipe 33, a muffler 34, a heat shielding cover 35, and an oxygen sensor 38. As shown in FIG. 4, the exhaust manifold 31 is an exhaust pipe including: branch pipes 31*a* connected to the respective exhaust ports 26*b* (see FIG. 8) of the cylinder head 26; and a joined pipe 31*b* formed such that the branch pipes 31*a* join together.

As shown in FIGS. 2 and 3, the pre-muffler 32 is located behind the exhaust manifold 31. A downstream end of the exhaust manifold 31 is connected to the pre-muffler 32. The coupling exhaust pipe 33 connects the pre-muffler 32 to the muffler 34 (see FIG. 1) located at a lateral side of the pre-muffler 32. In FIGS. 2 to 4, the muffler 34 is not shown.

The heat shielding cover 35 covers the exhaust manifold 31 at least from above. The heat shielding cover 35 is made of, for example, metal, but may be made of heat-resistant resin. The heat shielding cover 35 is supported by the exhaust manifold 31. An air gap AG (see FIG. 8) that is an air layer exists between the heat shielding cover 35 and the exhaust manifold 31. Specifically, the heat shielding cover 35 includes: a first cover 36 covering the branch pipes 31*a* of the exhaust manifold 31; and a second cover 37 covering the joined pipe 31*b* of the exhaust manifold 31. The second cover 37 is located so as to be continuous with the first cover 36. The heat shielding cover 35 does not have to be divided into the first cover 36 and the second cover 37. Moreover, the second cover 37 may be omitted.

The first cover 36 covers the entire group of the branch pipes 31*a* of the exhaust manifold 31. The first cover 36 is supported by the cylinder head cover 27 and the exhaust manifold 31. The first cover 36 peripherally covers the group of the branch pipes 31*a* of the exhaust manifold 31 from a front side, a lower side, a left side, and a right side. The first cover 36 includes an inlet 36*a* into which air flows from a below-described discharge duct 43. The inlet 36*a* may be, for example, a cutout formed by cutting out part of the first cover 36. The first cover 36 does not have to cover the branch pipes 31*a* of the exhaust manifold 31 from a lower side.

The second cover 37 covers the joined pipe 31*b* of the exhaust manifold 31. The second cover 37 is supported by the exhaust manifold 31 and the pre-muffler 32. The second cover 37 covers an upper portion of the joined pipe 31*b* from an upper side, a left side, and a right side, but does not cover a lower portion of the joined pipe 31*b*. To be specific, the second cover 37 exposes the joined pipe 31*b* of the exhaust manifold 31 to an outside toward a lower side. The second cover 37 may cover the lower portion of the joined pipe 31*b* of the exhaust manifold 31.

The oxygen sensor 38 is connected to the joined pipe 31*b* of the exhaust manifold 31. The oxygen sensor 38 detects the amount of oxygen in the exhaust flowing through the joined pipe 31*b*. The oxygen sensor 38 projects upward from the joined pipe 31*b* and penetrates the second cover 37 toward an upper side.

The air cooling structure 16 that cools the exhaust assembly 15 is mounted on the internal combustion engine EG. The air cooling structure 16 includes a fan 41, a holder 44, and a linkage 45. The fan 41 sends outside air toward the exhaust assembly 15. The fan 41 is a special fan that is located outside the continuously variable transmission TM and cools the exhaust assembly 15. The fan 41 is located at a front side of the cylinder 21. The fan 41 is located at one side of the cylinder 21 in the front-rear direction Y which is the same as a side where the intake ports 26*a* are located. An upper end of the fan 41 is lower than an upper end of the cylinder head cover 27. A rotational center of an impeller 54 (see FIG. 6) of the fan 41 is lower than a lower end of the cylinder head cover 27. The rotational center of the impeller 54 (see FIG. 6) of the fan 41 is closer to the cylinder 21 than a front end of the crank case 20 in the front-rear direction Y.

As shown in FIG. 4, the fan 41 is adjacent to the extending portion 20*b* of the crank case 20 in the upper-lower direction Z. The fan 41 overlaps the extending portion 20*b* of the crank case 20 when viewed from above. Part of the fan 41 projects outward in the left-right direction X beyond an outer end 21*a* of the cylinder 21 in the left-right direction X. In the left-right direction X, a half or more of the fan 41 is located at an inside of an outer end 20*c* of the crank case 20.

As shown in FIG. 5, the fan 41 is adjacent to the cylinder 21 of the internal combustion engine EG in the front-rear direction Y. The fan 41 overlaps the cylinder 21 when viewed from a front side. Specifically, the fan 41 overlaps the cylinder 21 in an end region located between the outer end 21*a* (see FIG. 4) of the cylinder 21 in the left-right direction X and the intake port 26*a* located closest to the outer end 21*a* in the left-right direction X. To be specific, the fan 41 is located outside the group of all the intake ports 26*a* in the left-right direction X and overlaps the cylinder 21 when viewed from a front side.

The fan 41 is mechanically connected to the crank shaft 22 (see FIG. 7) of the internal combustion engine EG and operates in association with the rotation of the crank shaft 22. The driving power of the crank shaft 22 of the internal combustion engine EG is transmitted to the fan 41 through the linkage 45. The linkage 45 is a power transmission mechanism, and details thereof will be described later. The extending portion 20*b* of the crank case 20 includes a through hole H that is open in the upper-lower direction Z.

The linkage 45 is inserted into the through hole H of the crank case 20 in the upper-lower direction Z. A portion of the linkage 45 which projects from the crank case 20 to an outside is accommodated in the holder 44. The holder 44 is made of, for example, metal. The holder 44 is detachably fixed to an upper surface of the extending portion 20*b* of the crank case 20 by bolts so as to cover the through hole H from above. The linkage 45 is supported by the holder 44.

The holder 44 is located at a front side of the cylinder 21 of the internal combustion engine EG. The holder 44 is located under the intake ports 26*a* of the cylinder 21. The fan 41 and the holder 44 are adjacent to each other in the left-right direction X. The fan 41 is adjacent to the holder 44 from an outside in the left-right direction X based on the cylinder 21. To be specific, the fan 41 is located at an outside of the holder 44 in the left-right direction X based on the cylinder 21.

The holder 44 overlaps the cylinder 21 when viewed from a front side. As shown in FIG. 4, the holder 44 overlaps the extending portion 20*b* of the crank case 20 when viewed from above. A front end of the holder 44 is located behind a front end of the fan 41. The entire holder 44 is hidden by the fan 41 when viewed from an outside in the left-right direction X (see FIG. 3).

Figure 6:
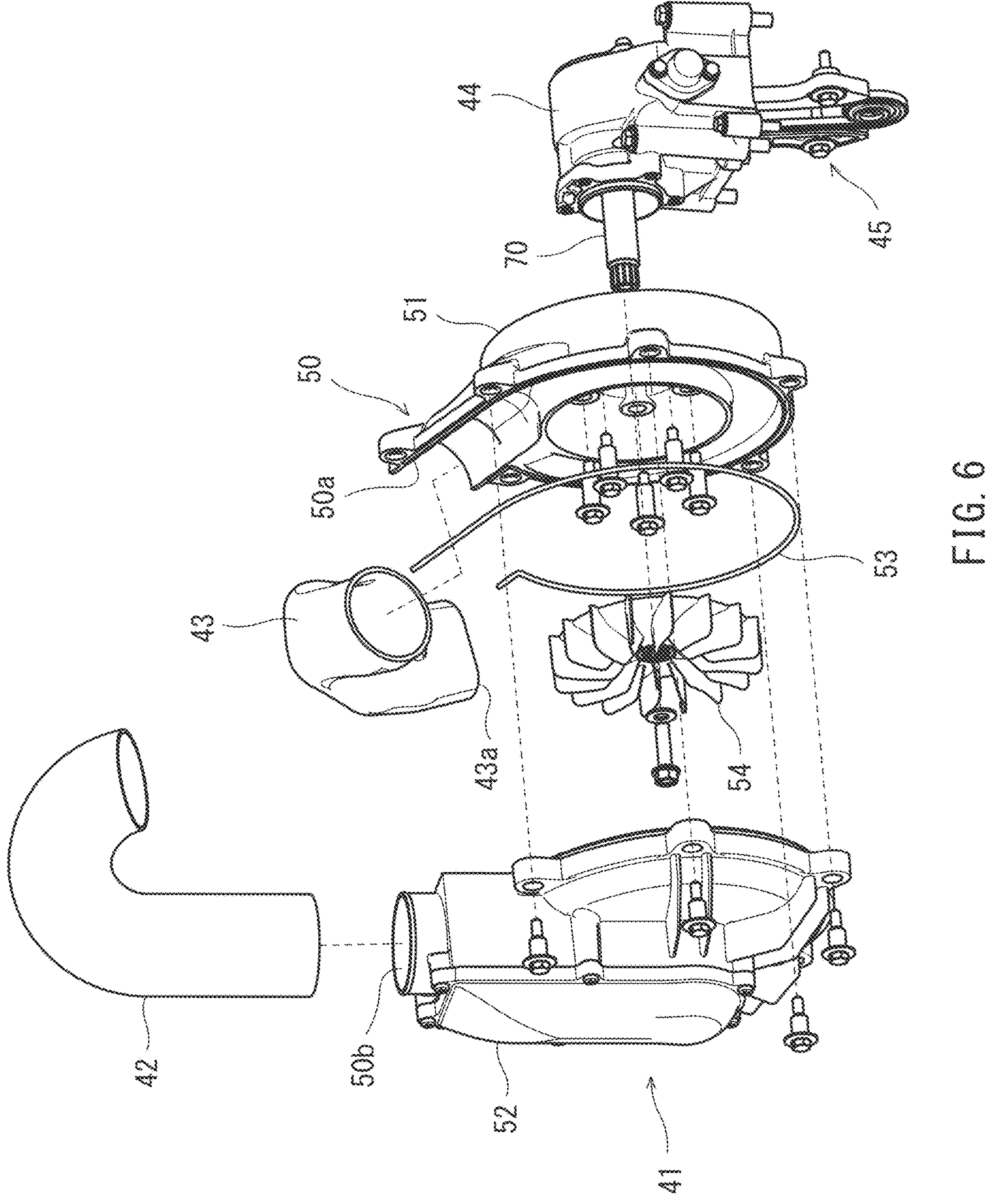
FIG. 6 is an exploded perspective view showing a fan, a holder, and the like shown in FIG. 5.

FIG. 6 is an exploded perspective view showing the fan 41, the holder 44, and the like shown in FIG. 5. As shown in FIG. 6, the fan 41 includes a fan housing 50, a seal 53, and the impeller 54. The fan housing 50 includes a first half body 51 and a second half body 52 which are combined with each other in a rotation axis direction of the fan 41 and fixed to each other by bolts. The fan housing 50 includes an inflow port 50*a* and an outflow port 50*b*. A suction duct 42 is connected to the inflow port 50*a* of the fan housing 50. The discharge duct 43 is connected to the outflow port 50*b* of the fan housing 50.

The seal 53 is sandwiched between the first half body 51 and the second half body 52. The impeller 54 is accommodated in the fan housing 50. The impeller 54 rotates to send wind toward a radially outer side of the impeller 54. To be specific, the fan 41 is a centrifugal fan. Therefore, the size of the air cooling structure 16 in the left-right direction X is small. A below-described fan driving shaft 70 of the linkage 45 is coupled to the impeller 54. To be specific, the impeller 54 is rotated by the rotation of the fan driving shaft 70.

Figure 7:
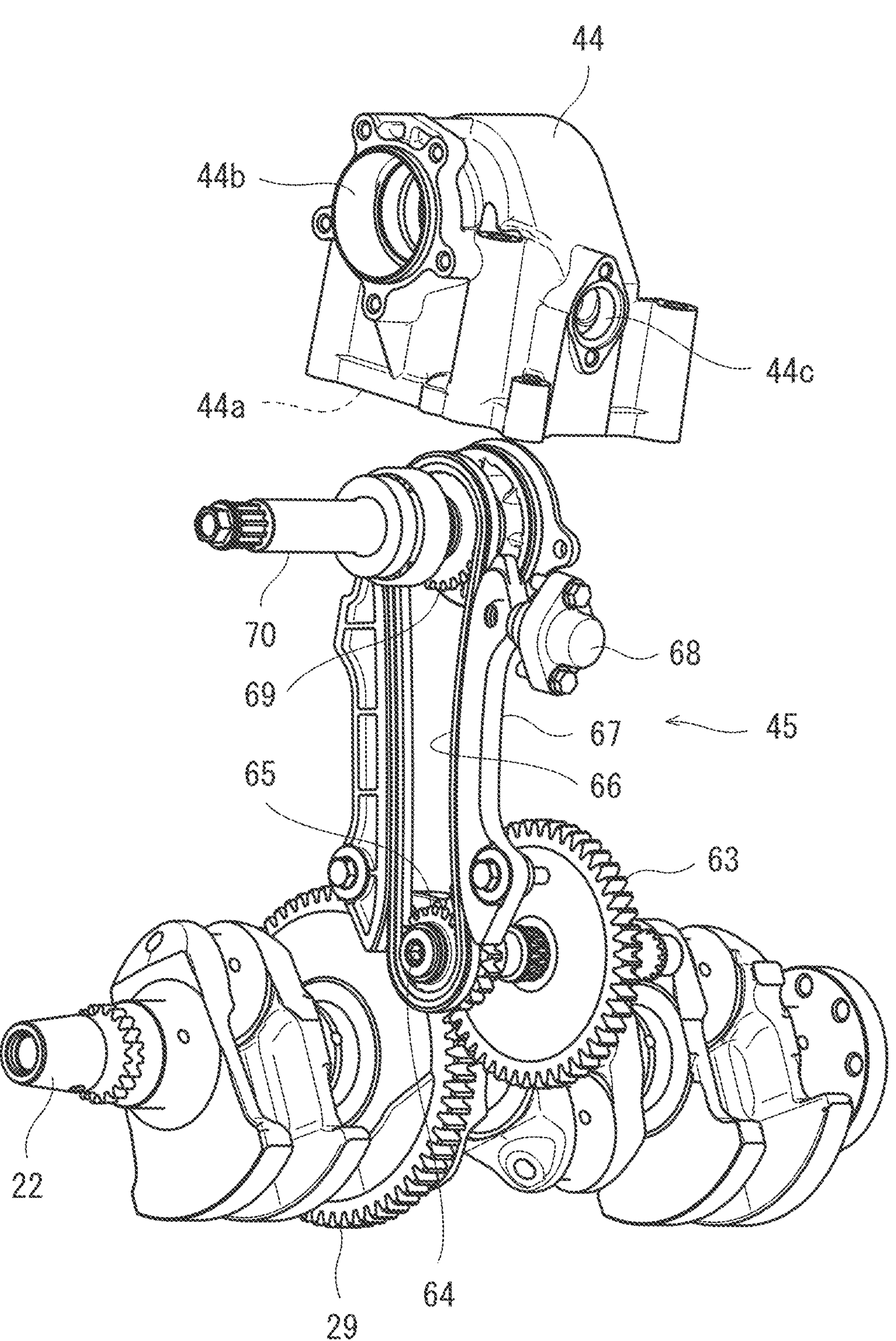
FIG. 7 is an exploded perspective view showing the holder, a linkage, and the like shown in FIG. 6.

FIG. 7 is an exploded perspective view showing the holder 44, the linkage 45, and the like shown in FIG. 6. As shown in FIG. 7, the linkage 45 includes a driven gear 63, a driving shaft 64, a driving sprocket 65, a chain 66, a chain guide 67, a tensioner 68, a driven sprocket 69, and the fan driving shaft 70.

The driven gear 63 meshes with a driving gear 29 fixed to the crank shaft 22. The driven gear 63 rotates integrally with the driving shaft 64. The driving sprocket 65 is fixed to the driving shaft 64. The driven sprocket 69 is located above the driving sprocket 65. The chain 66 is wound around the driving sprocket 65 and the driven sprocket 69.

The chain guide 67 is located between the driving sprocket 65 and the driven sprocket 69 along the chain 66 and guides the chain 66. The tensioner 68 pushes the chain guide 67 toward the chain 66. The fan driving shaft 70 rotates integrally with the driven sprocket 69. A rotation axis of the fan driving shaft 70 is parallel to a rotation axis of the crank shaft 22.

The holder 44 includes an opening 44*a* that opens an internal space of the holder 44 to a lower side. An upper portion of the linkage 45 is inserted into the holder 44 through the opening 44*a*. The holder 44 includes a shaft insertion hole 44*b* into which the fan driving shaft 70 is inserted. The holder 44 includes a tensioner hole 44*c* into which the tensioner 68 is inserted. The linkage 45 extends through the through hole H (see FIG. 5) from an inside of the crank case 20 to an outside of the crank case 20.

Figure 8:
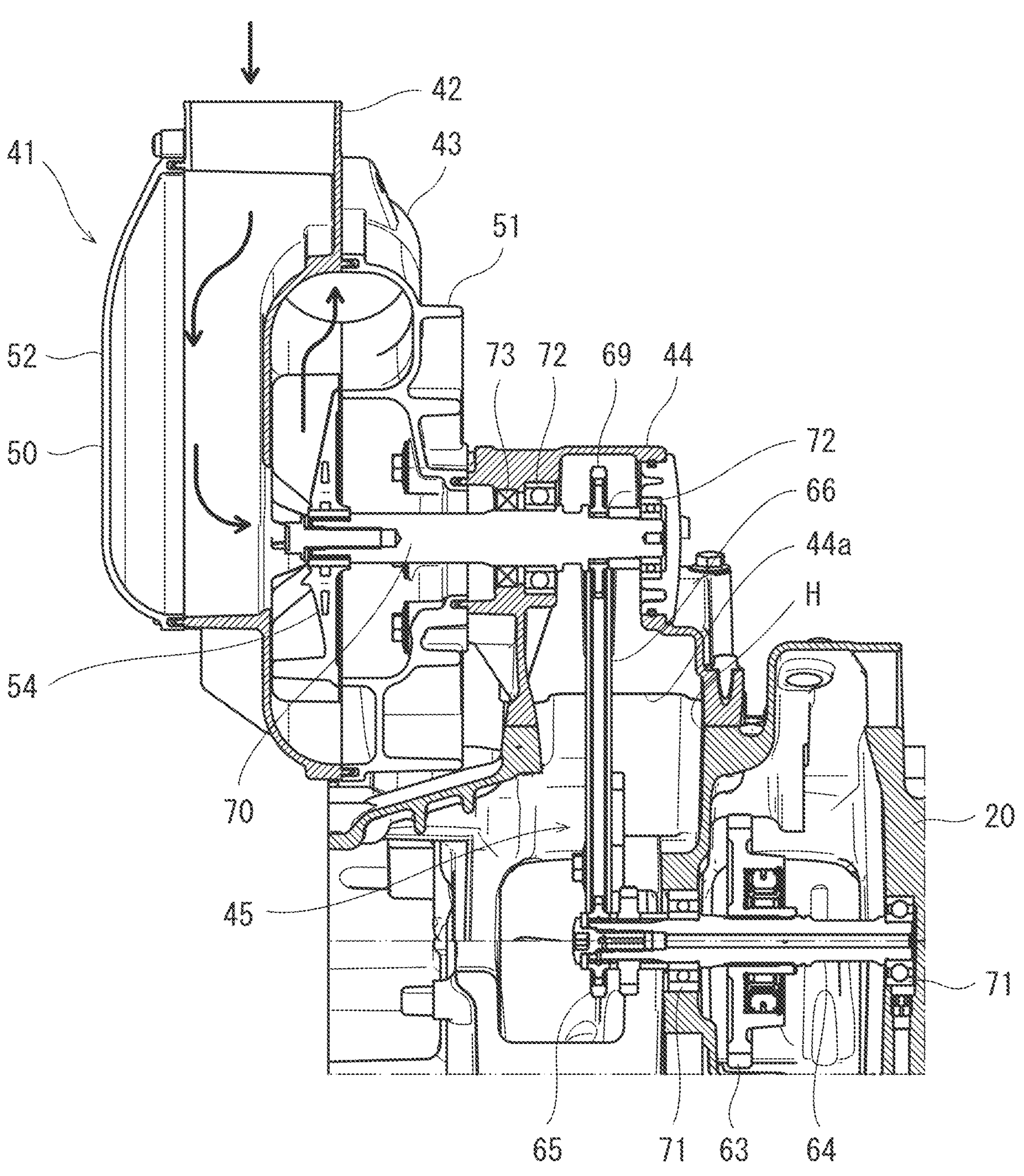
FIG. 8 is a sectional view showing power transmission to the fan of FIG. 6 when viewed from a vehicle front side.

FIG. 8 is a sectional view showing power transmission to the fan 41 of FIG. 6 when viewed from a vehicle front side. As shown in FIG. 8, the driving shaft 64 is rotatably supported by the crank case 20 through a bearing 71. The fan driving shaft 70 is rotatably supported by the holder 44 through a bearing 72. An oil seal 73 located between the fan driving shaft 70 and the holder 44 is located at a position of the holder 44 which is closer to the fan 41 than the bearing 72. The oil seal 73 prevents oil existing in the internal space of the holder 44 from leaking toward the fan 41.

The driving power transmitted from the driving gear 29 (see FIG. 7) of the crank shaft 22 to the driven gear 63 rotates the driving shaft 64. The rotational power of the driving shaft 64 rotates the fan driving shaft 70 through the driving sprocket 65, the chain 66, and the driven sprocket 69. The rotational power of the fan driving shaft 70 rotates the impeller 54. Air in the suction duct 42 is sucked into the fan housing 50 by the rotation of the impeller 54. The sucked air flows to a radially outer side of the impeller 54 by the rotation of the impeller 54 and is supplied to a passage of the discharge duct 43.

Referring back to FIGS. 3 to 5, the discharge duct 43 extends through an upper side of the cylinder 21. To be specific, the discharge duct 43 extends from a front side of the cylinder 21 to a rear side of the cylinder 21 and extends through an upper side of the cylinder head cover 27. The discharge duct 43 has an inverted U shape that is convex upward when viewed in the left-right direction X. A downstream end of the discharge duct 43 includes a discharge port 43*a*. The discharge port 43*a* of the discharge duct 43 is directed to the exhaust assembly 15. The discharge port 43*a* of the discharge duct 43 is lower than the upper end of the cylinder head cover 27.

For example, the discharge port 43*a* of the discharge duct 43 is directed to the exhaust manifold 31 located inside the heat shielding cover 35. Specifically, the discharge port 43*a* of the discharge duct 43 is located outside the heat shielding cover 35. Part of the discharge port 43*a* of the discharge duct 43 is opposed to the branch pipes 31*a* of the exhaust manifold 31 through the inlet 36*a* of the first cover 36, and another part of the discharge port 43*a* of the discharge duct 43 is opposed to an upper surface of the first cover 36. The discharge port 43*a* of the discharge duct 43 may be located inside the first cover 36 in such a manner that a tip portion of the discharge duct 43 extends through the inlet 36*a* of the first cover 36.

As shown in FIG. 5, the discharge port 43*a* of the discharge duct 43 is opposed from above to the branch pipes 31*a* of the exhaust manifold 31 that is part of the exhaust assembly 15. The discharge duct 43 is located at an inside of an outer end of the fan 41 in the left-right direction X. The discharge duct 43 extends from the fan 41 to an inside in the left-right direction X and a rear side. The suction duct 42 extends upward from the fan 41 and inward in the left-right direction X. An suction port 42*a* of the suction duct 42 is directed to a lower side. The suction port 42*a* of the suction duct 42 is higher than the upper end of the cylinder head cover 27.

Figure 9:
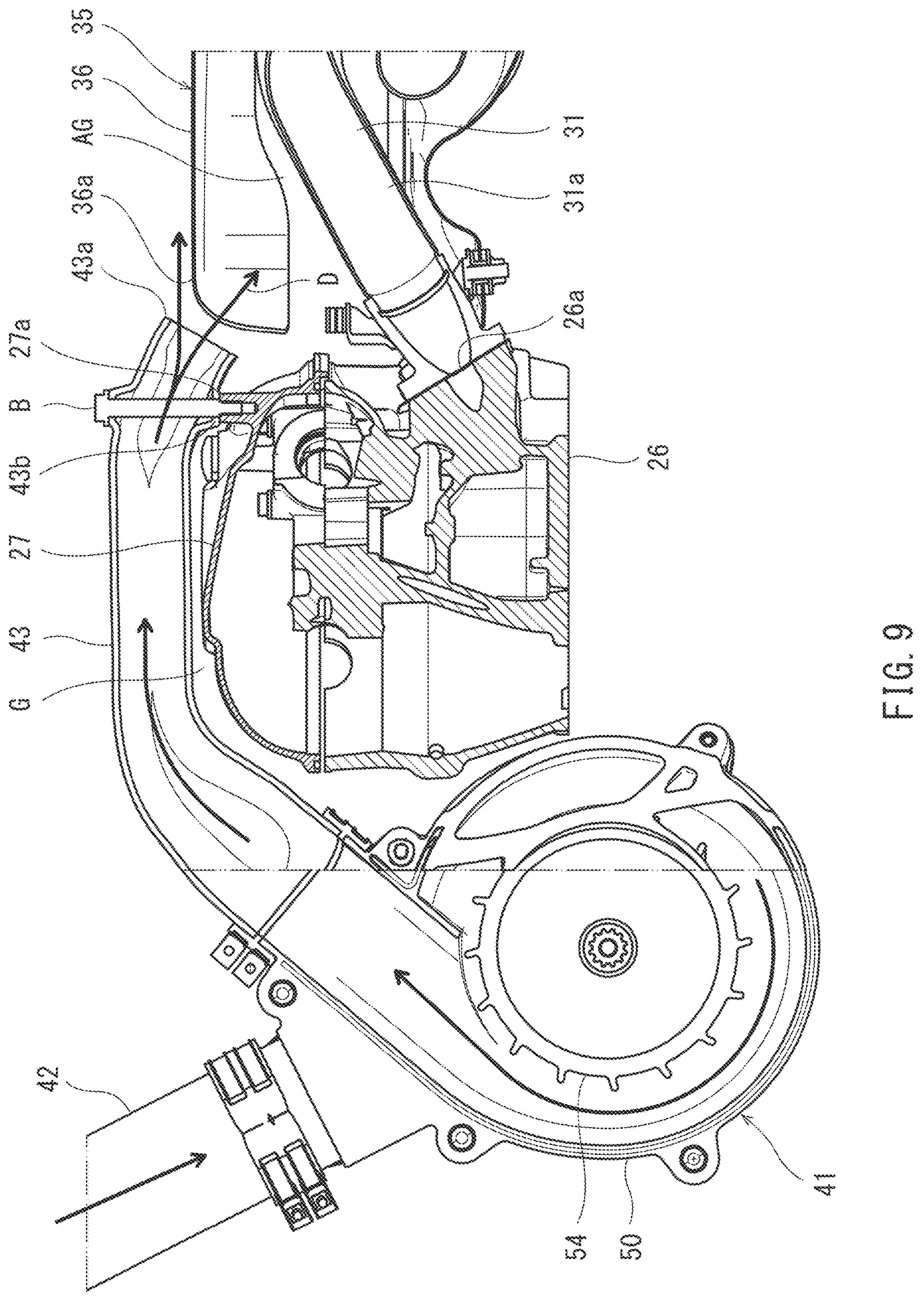
FIG. 9 is a sectional view showing the flow of air in the fan and a discharge duct shown in FIG. 3 when viewed from a vehicle lateral side.
Figure 10:
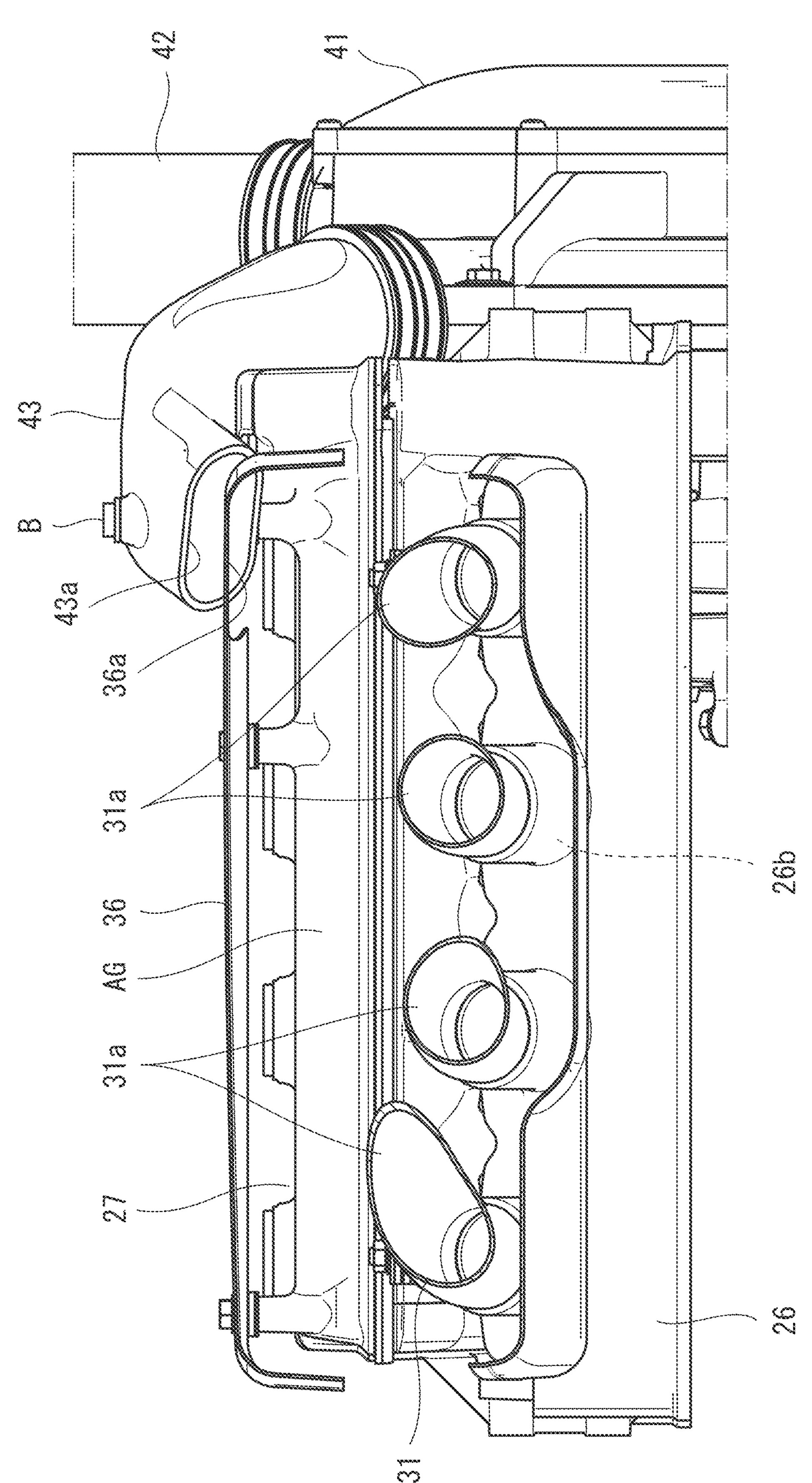
FIG. 10 is a sectional view showing the internal combustion engine, the exhaust assembly, and the air cooling structure shown in FIG. 2 when viewed from a vehicle rear side.

FIG. 9 is a sectional view showing the flow of air in the fan 41 and the discharge duct 43 shown in FIG. 3 when viewed from a vehicle lateral side. FIG. 10 is a sectional view showing the internal combustion engine EG, the exhaust assembly 15, and the air cooling structure 16 shown in FIG. 2 when viewed from a vehicle rear side. As shown in FIG. 9, the discharge duct 43 is partially fixed to the cylinder head cover 27 by a bolt B. A gap G exists between the discharge duct 43 and the cylinder head cover 27.

The cylinder head cover 27 includes a boss 27*a* projecting upward. The discharge duct 43 includes a boss 43*b* projecting downward. With the boss 43*b* of the discharge duct 43 placed on the boss 27*a* of the cylinder head cover 27 from above, the bosses 43*b* and 27*b* are fastened to each other by the bolt B. To be specific, the discharge duct 43 contacts the cylinder head cover 27 only by the boss 43*b*. The bolt B penetrates the discharge duct 43 from its upper surface to its lower surface and extends through the passage of the discharge duct 43.

As shown in FIGS. 9 and 10, the air gap AG exists between the heat shielding cover 35 and the exhaust manifold 31. Part of the air sent to the discharge duct 43 by the fan 41 is discharged to an internal space of the first cover 36 through the discharge port 43*a*. The discharge port 43*a* is located outside the first cover 36 and at a vertically upper side of the exhaust manifold 31. A discharge direction D of the discharge port 43*a* of the discharge duct 43 includes a direction component directed to a lower side. Therefore, the air discharged from the discharge port 43*a* spreads in the internal space of the first cover 36 while hitting the exhaust manifold 31 or an inner wall surface of the first cover 36, to cool the branch pipes 31*a* of the exhaust manifold 31.

The discharge port 43*a* of the discharge duct 43 is located at a front side of the first cover 36. The discharge direction D of the discharge port 43*a* of the discharge duct 43 includes a direction component directed to a rear side. Therefore, the air discharged from the discharge port 43*a* flows rearward along the exhaust manifold 31 and easily flows from the first cover 36 toward the second cover 37. The air which has cooled the branch pipes 31*a* and moved to a space under the second cover 37 (see FIG. 2) is discharged to an outside of the exhaust assembly 15 while cooling the joined pipe 31*b*.

As shown in FIGS. 4 and 10, the discharge port 43*a* of the discharge duct 43 is located closest to a specific one of the branch pipes 31*a* which is located at a most end in the left-right direction X. The discharge direction D of the discharge port 43*a* of the discharge duct 43 includes direction components which are directed in the left-right direction X so as to be directed to the remaining branch pipes 31*a* other than the specific branch pipe 31*a*. Therefore, the air discharged from the discharge port 43*a* easily cools all the branch pipes 31*a*.

As shown in FIG. 9, another part of the air sent to the discharge duct 43 by the fan 41 is discharged from the discharge port 43*a* toward the upper surface of the first cover 36. The air discharged from the discharge port 43*a* of the discharge duct 43 to an upper surface of the heat shielding cover 35 can remove garbage (for example, grass) on the upper surface of the heat shielding cover 35.

According to the above-described configuration, the high-temperature exhaust assembly 15 is air-cooled by the fan 41 that sends outside air. Therefore, even when the high output internal combustion engine EG is used, an excessive temperature increase of the exhaust assembly 15 can be prevented. Then, the fan 41 is located so as to overlap the internal combustion engine EG in the front-rear direction Y. Therefore, the width of the entirety including the internal combustion engine EG the fan 41 in the left-right direction X in which the crank shaft 22 extends does not become large, and this can prevent the vehicle 1 from increasing in size.

The exhaust assembly 15 is located behind the cylinder 21, and the fan 41 is located in front of the cylinder 21. While the vehicle is traveling, the heat from the cylinder 21 and the exhaust assembly 15 tends to flow rearward. Therefore, the temperature increase of the fan 41 can be suitably suppressed.

The fan 41 is located at a front side of the cylinder 21. Therefore, the fan 41 can be located by effectively utilizing a space which is adjacent to the cylinder 21 and located at the front side that is an intake side of the internal combustion engine EG. Moreover, since the fan 41 is located at a position closer to the intake ports 26*a* than the exhaust ports 26*b*, the temperature increase of the fan 41 is suppressed, and an air-cooling effect of air-cooling the exhaust assembly 15 by the fan 41 can be satisfactorily maintained.

Since the fan 41 is adjacent to the extending portion 20*b* of the crank case 20 in the upper-lower direction Z, the fan 41 can be efficiently located by utilizing a dead space formed by the extending portion 20*b* of the crank case 20 and the cylinder 21.

When viewed in the front-rear direction Y, the fan 41 overlaps the cylinder 21 in the end region located between the outer end 21*a* of the cylinder 21 in the left-right direction X and the intake port 26*a* located closest to the outer end 21*a* of the cylinder 21 in the left-right direction X. Therefore, the fan 41 can be easily located while avoiding interference with intake pipes connected to the intake ports 26*a*.

The driving power of the internal combustion engine EG is transmitted to the fan 41 through the linkage 45. Therefore, as the output of the internal combustion engine EG increases, the temperature of the exhaust assembly 15 increases, however, as the output of the internal combustion engine EG increases, the output of the fan 41 increases. Therefore, an excessive temperature increase of the exhaust assembly 15 can be efficiently prevented by the fan 41.

The holder 44 fixed to the crank case 20 supports the linkage 45 while covering the upper portion of the linkage 45 which is located outside the crank case 20. Therefore, the linkage 45 can be stably mounted on the internal combustion engine EG, and the linkage 45 can be hidden by the holder 44.

The holder 44 covers the through hole H of the extending portion 20*b* of the crank case 20. Therefore, the holder 44 can be efficiently located by utilizing the dead space formed by the extending portion 20*b* of the crank case 20 and the cylinder 21.

The holder 44 overlaps the cylinder 21 in the front-rear direction Y. Therefore, the width of the entirety including the internal combustion engine EG, the fan 41, and the holder 44 in the left-right direction X in which the crank shaft 22 extends does not become large, and this can prevent the vehicle 1 from increasing in size.

The holder 44 is located at a front side of the cylinder 21 which includes the intake ports 26*a* at the front side. Therefore, the holder 44 can be located by effectively utilizing the space which is located at the intake side and adjacent to the cylinder 21.

When viewed in the front-rear direction Y, the holder 44 is located under the intake ports 26*a* of the cylinder 21. Therefore, the holder 44 can be located by effectively utilizing a space located under the intake pipes connected to the intake ports 26*a*.

The fan 41 and the holder 44 are adjacent to each other in the left-right direction X. Therefore, the size of the entirety including the fan 41 and the holder 44 in the upper-lower direction Z can be prevented from becoming large.

The fan 41 is adjacent to the holder 44 from an outside in the left-right direction X based on the fan 41. Therefore, even in the case of using the fan 41 larger than the holder 44, the fan 41 can be easily located.

The discharge duct 43 is connected to the fan 41, and the discharge port 43*a* of the discharge duct 43 is directed to the exhaust assembly 15. Therefore, the air can be made to blow against a target portion of the exhaust assembly 15 from the discharge port 43*a* of the discharge duct 43.

The discharge port 43*a* of the discharge duct 43 is directed to the exhaust manifold 31 located inside the heat shielding cover 35. Therefore, the air discharged from the discharge port 43*a* of the discharge duct 43 spreads inside the heat shielding cover 35, and the inside of the heat shielding cover 35 is entirely cooled. Thus, the branch pipes 31*a* of the exhaust manifold 31 can be entirely cooled.

The discharge duct 43 extends through an upper side of the cylinder 21. Therefore, the width of the entirety including the internal combustion engine EG, the fan 41, and the discharge duct 43 in the left-right direction X does not become large, and this can prevent the vehicle 1 from increasing in size.

Heat of the exhaust manifold 31 tends to move upward. However, since the discharge port 43*a* of the discharge duct 43 is opposed to part of the exhaust assembly 15 from above, the exhaust assembly 15 is cooled from above, and this can improve the cooling effect.

The discharge duct 43 is located at an inside of an outer end of the fan housing 50 in the left-right direction X based on the internal combustion engine EG. Therefore, the discharge duct 43 does not project outward in the left-right direction X beyond the fan housing 50, and this can secure a space located outside the cylinder 21 in the left-right direction X.

The fan 41 is mounted on the internal combustion engine EG and operates in such a manner that the driving power of the internal combustion engine EG is transmitted to the fan 41 through the linkage 45. Therefore, a layout related to the fan 41 can be made compact. Moreover, as the output of the internal combustion engine EG increases, the temperature of the exhaust assembly 15 increases, however, as the output of the internal combustion engine EG increases, the output of the fan 41 increases. Therefore, the excessive temperature increase of the exhaust assembly 15 can be efficiently prevented by the fan 41. As above, the excessive temperature increase of the exhaust assembly 15 can be prevented while preventing the off-road vehicle 1 from increasing in size.

Embodiment 2

Figure 11:
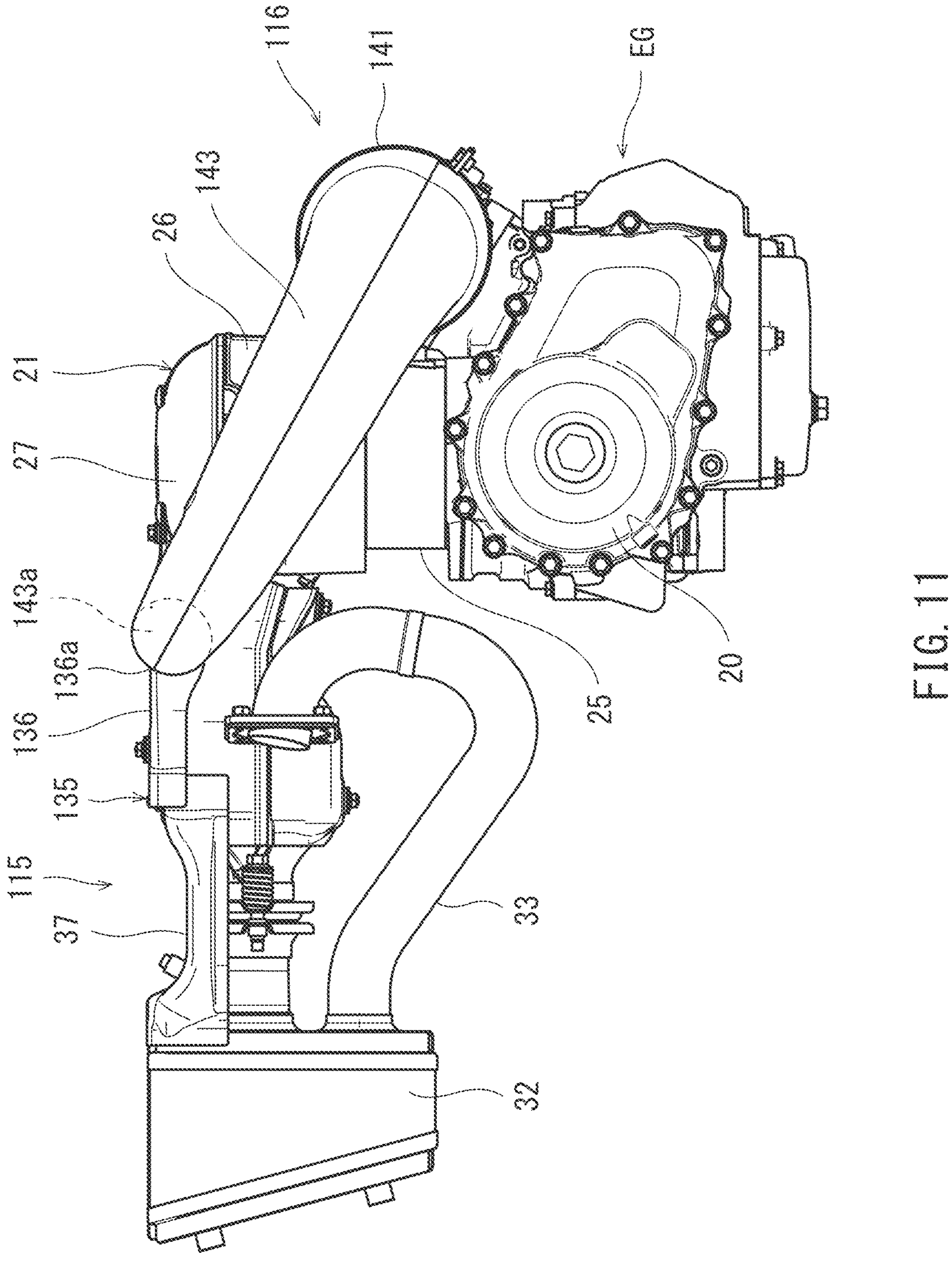
FIG. 11 is a right side view showing the internal combustion engine, the exhaust assembly, and the air cooling structure in the off-road vehicle according to Embodiment 2.
Figure 12:
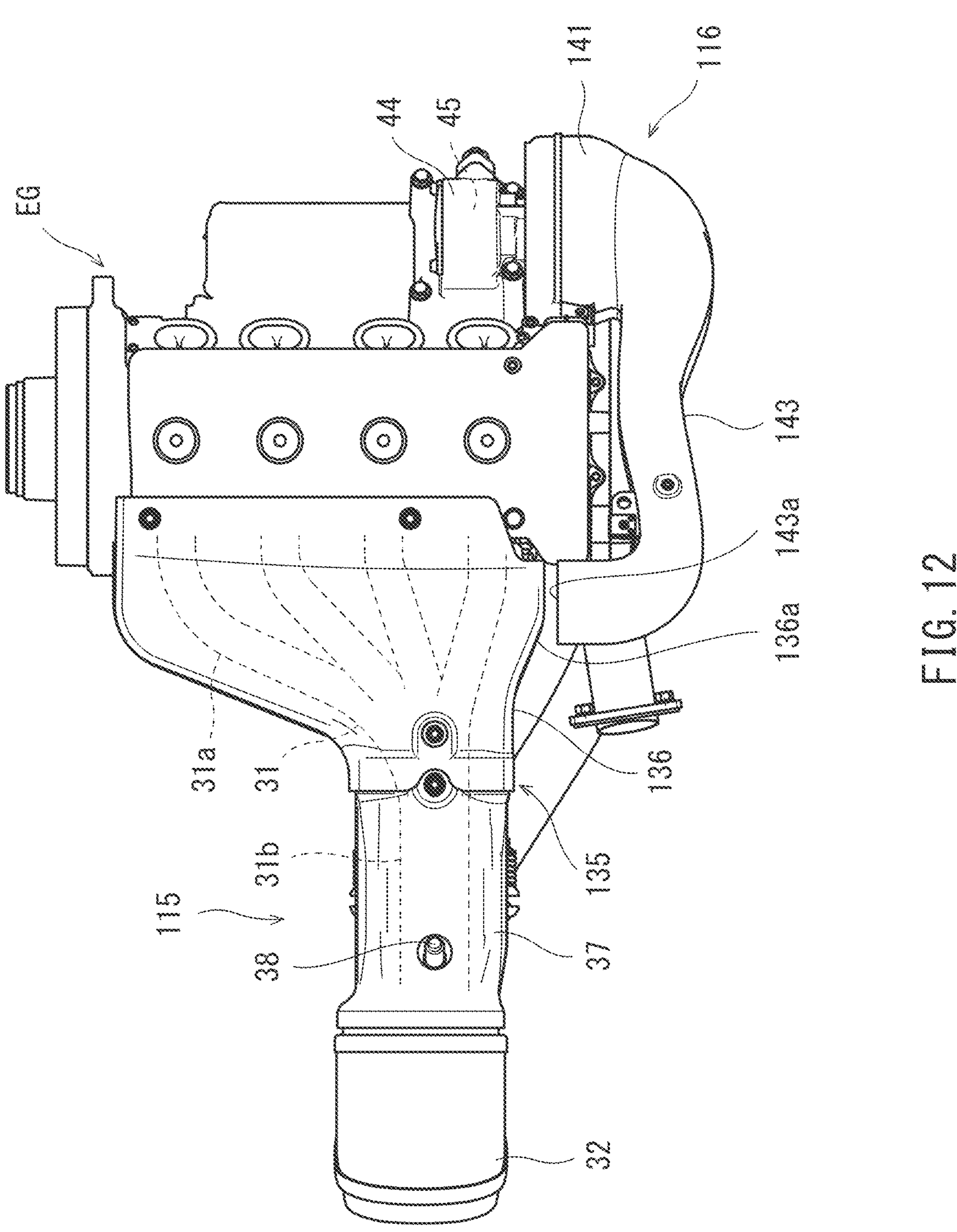
FIG. 12 is a plan view showing the internal combustion engine, the exhaust assembly, and the air cooling structure shown in FIG. 11.

FIG. 11 is a right side view showing the internal combustion engine EG, an exhaust assembly 115, and an air cooling structure 116 in the off-road vehicle according to Embodiment 2. FIG. 12 is a plan view showing the internal combustion engine EG, the exhaust assembly 115, and the air cooling structure 116 shown in FIG. 11. The same reference signs are used for the same components as Embodiment 1, and explanations thereof are omitted. As shown in FIGS. 11 and 12, a fan 141 of the air cooling structure 116 is an axial fan. Based on the internal combustion engine EG, an inflow port of the fan 141 is directed to an inside in the left-right direction X, and an outflow port of the fan 141 is directed to an outside in the left-right direction X.

A discharge duct 143 connected to the outflow port of the fan 141 extends through a space which is located outside the cylinder 21 in the left-right direction X. An inlet 136*a* is located on a side wall of a first cover 136 of the exhaust assembly 115. A discharge port 143*a* of the discharge duct 143 is located outside the first cover 136. Part of the discharge port 143*a* of the discharge duct 143 is opposed to the branch pipes 31*a* of the exhaust manifold 31 from a lateral side through the inlet 136*a* of the first cover 136. Another part of the discharge port 143*a* of the discharge duct 143 is opposed to an upper space of the first cover 136 from a lateral side. The discharge port 143*a* of the discharge duct 143 may be located inside the first cover 136 in such a manner that a tip portion of the discharge duct 143 extends through the inlet 136*a* of the first cover 136.

According to this configuration, the discharge duct 143 can be easily prevented from interfering with the cargo bed 10 (see FIGS. 1 and 3) located vertically above the exhaust assembly 115. Therefore, even when a gap between the cargo bed 10 and the exhaust assembly 115 in the upper-lower direction Z is small, the exhaust assembly 115 can be cooled satisfactorily. Since the other components are the same as those in Embodiment 1, explanations thereof are omitted.

The technology of the present disclosure is not limited to the above-described embodiments. For example, a direction in which the internal combustion engine EG is located is not especially limited. As a modified example, the exhaust ports 26*b* may be located at a front side of the internal combustion engine EG, and the exhaust assembly 15 may extend from a front side of the internal combustion engine EG through a lateral side of the internal combustion engine EG to a rear side of the internal combustion engine EG. In this case, the fan 41 may be located at a rear side of the internal combustion engine EG, and the discharge duct 43 may extend from a rear side of the internal combustion engine EG to a front side of the internal combustion engine EG.

The discharge port 43*a*, 143*a* of the discharge duct 14, 143 may be opposed to the joined pipe 31*b* of the exhaust manifold 31. The discharge port 43*a*, 143*a* of the discharge duct 14, 143 may be opposed to an outer surface of the heat shielding cover 35, 135 and may discharge the air against the outer surface of the heat shielding cover 35, 135 to cool the heat shielding cover 35, 135. The heat shielding cover 35, 135 may be omitted. The discharge port 43*a*, 143*a* of the discharge duct 14, 143 may be directed to the oxygen sensor 38.

As the linkage 45, the foregoing has described a structure including a chain-sprocket mechanism. However, the linkage 45 is not limited to this. For example, the linkage 45 may be a structure including a pulley-belt mechanism and/or a gear mechanism.

The foregoing has described the embodiments as examples of the technology disclosed in the present application. However, the technology in the present disclosure is not limited to these and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

What is claimed is:

1. An off-road vehicle comprising:

an internal combustion engine including
  a crank shaft,
  a crank case accommodating the crank shaft, and
  a cylinder projecting from the crank case and including an intake port and an exhaust port;

an exhaust assembly including an exhaust pipe connected to the exhaust port of the cylinder; and a fan that sends outside air toward the exhaust assembly, wherein:

a direction orthogonal to both of a first direction in which the crank shaft extends and a second direction in which the cylinder extends is defined as a third direction;

the exhaust assembly is adjacent to the internal combustion engine in the third direction; and the fan overlaps the internal combustion engine in the third direction.

2. The off-road vehicle according to claim 1, wherein:

the first direction is a left-right direction of the vehicle;

the second direction is an upper-lower direction of the vehicle; and the third direction is a front-rear direction of the vehicle.

3. The off-road vehicle according to claim 1, wherein:

the intake port is located at a first side of the cylinder in the third direction;

the exhaust port is located at a second side of the cylinder in the third direction;

the exhaust assembly is located at the second side of the cylinder in the third direction; and the fan is located at the first side of the cylinder in the third direction.

4. The off-road vehicle according to claim 1, wherein:

the crank case includes an extending portion extending to a first side in the third direction beyond the cylinder; and the fan is adjacent to the extending portion in an upper-lower direction.

5. The off-road vehicle according to claim 1, wherein when viewed in the third direction, the fan overlaps the cylinder in an end region located between an outer end of the cylinder in the first direction and the intake port located closest to the outer end of the cylinder in the first direction.

6. The off-road vehicle according to claim 1, further comprising a linkage that transmits driving power of the internal combustion engine to the fan.

7. The off-road vehicle according to claim 6, further comprising a holder that accommodates and supports the linkage, wherein:

the crank case includes a through hole through which the linkage extends from an inside of the crank case to an outside of the crank case; and the holder is fixed to the crank case and covers a portion of the linkage which is located outside the crank case.

8. The off-road vehicle according to claim 7, wherein:

the crank case includes an extending portion extending to a first side in the third direction beyond the cylinder;

the extending portion of the crank case includes the through hole; and the holder is fixed to the extending portion and covers the through hole.

9. The off-road vehicle according to claim 7, wherein the fan and the holder are adjacent to each other in the first direction.

10. The off-road vehicle according to claim 9, wherein the fan is adjacent to the holder from an outside in the first direction.

11. The off-road vehicle according to claim 7, wherein the holder overlaps the cylinder in the third direction.

12. The off-road vehicle according to claim 11, wherein:

the intake port is located at a first side of the cylinder in the third direction;

the exhaust port is located at a second side of the cylinder in the third direction; and the holder is located at the first side of the cylinder in the third direction.

13. The off-road vehicle according to claim 10, wherein when viewed in the third direction, the holder is located under the intake port of the cylinder.

14. The off-road vehicle according to claim 1, further comprising a discharge duct connected to the fan and including a discharge port, wherein:

the fan includes an impeller and a fan housing which accommodates the impeller and to which the discharge duct is connected; and the discharge port of the discharge duct is directed to part of the exhaust assembly.

15. The off-road vehicle according to claim 14, wherein:

the internal combustion engine is a multiple cylinder engine;

the exhaust assembly further includes
  an exhaust manifold including branch pipes and
  a heat shielding cover covering the branch pipes of the exhaust manifold; and the discharge port of the discharge duct is directed to at least the exhaust manifold.

16. The off-road vehicle according to claim 14, wherein:

the first direction is a left-right direction of the vehicle;

the second direction is an upper-lower direction of the vehicle;

the third direction is a front-rear direction of the vehicle;

the cylinder projects upward from the crank case; and the discharge duct extends through an upper side of the cylinder.

17. The off-road vehicle according to claim 16, wherein the discharge port of the discharge duct is opposed to part of the exhaust assembly from above.

18. The off-road vehicle according to claim 16, wherein the discharge duct is located at an inside of an outer end of the fan housing in the left-right direction of the vehicle.

19. The off-road vehicle according to claim 14, further comprising a cargo bed located above the exhaust assembly, wherein:

the first direction is a left-right direction of the vehicle;

the second direction is an upper-lower direction of the vehicle;

the third direction is a front-rear direction of the vehicle;

the cylinder projects upward from the crank case; and the discharge duct extends through a space which is located outside of the cylinder in the first direction of the vehicle.

* * * * *